United States Patent [19]

Simjian

[11] 4,268,817
[45] May 19, 1981

[54] CHECK CONTROLLED METERING DEVICE

[76] Inventor: Luther G. Simjian, 1750 S. Ocean La., Fort Lauderdale, Fla. 33316

[21] Appl. No.: 120,983

[22] Filed: Feb. 13, 1980

[51] Int. Cl.³ .............................................. H04Q 1/00
[52] U.S. Cl. ............................ 340/147 A; 340/149 A; 235/375
[58] Field of Search .......... 340/147 A, 149 R, 149 A; 235/375

[56] References Cited

U.S. PATENT DOCUMENTS 3,716,698  2/1973  Simjian ....................... 340/149 R X Primary Examiner—Harold I. Pitts

[57] ABSTRACT

A postage meter is used in conjunction with a coded check which serves for updating, i.e. increasing the credit register, by a predetermined sum of money. In order to update the register the code of the check must be valid and a code known to an operator must be provided to the meter. Means are provided to invalidate the check after use and to provide the check with data related to the meter.

10 Claims, 3 Drawing Figures

CHECK CONTROLLED METERING DEVICE

SUMMARY OF THE INVENTION

This invention refers to metering devices which are adapted to dispense a unit of value in response to being charged with a sum of money. Typical of such devices is the commercially used postage metering device which is adapted to imprint variable amounts of postage on envelopes and tapes as long as the credit balance remains above a predetermined sum of money. When the predetermined minimum credit balance is reached, the meter is inhibited from imprinting further postage. At that time or at some time prior to reaching the minimum credit balance the meter must be recharged, that is, the credit register must be set to a monetary value in excess of the minimum balance. Such recharging most commonly is done by bringing the removable register portion of the metering device to the Post Office and upon paying a sum of money, for instance $500.00, an authorized Post Office employee using a special key sets the credit register to a value reflecting the $500.00 payment. In the recent period a system has come into use in which the meter can be recharged by obtaining a code from a remotely located computer, thus avoiding the need of bringing the register to the Post Office. Illustrative of the various arrangements of postage meters and means for restoring the credit register to a balance above a minimum without bringing the meter to the Post Office are U.S. Pat. Nos. 3,255,439, 3,428,948; 3,501,744; 3,596,247; 3,716,698 and 3,792,446.

The instant invention also overcomes the need for removing the register and bringing it to the Post Office and instead uses a special code means which is purchased from the Post Office or a bank. The code means, for instance a specially coded check, is purchased by the meter owner and is used whenever the credit register requires to be reset to reflect an increased credit balance. A check of this type may be purchased at the Post Office personally, or may be purchased via the mails. In addition, the meter must be supplied also with an operator code which is inserted into the meter by keying means.

The present invention, therefore, discloses an arrangement for simplifying the process of recharging the credit register by obviating the need for a trip to the Post Office or the use of computer means. Instead, the present invention contemplates the use of a predetermined personal identification code signal in conjunction with a check, both if found valid enabling updating of the credit register to reflect an increase of the available credit balance by a predetermined amount of money. Additionally, the invention includes means for insuring that a check is usable only for one charging or a predetermined number of charging operations and then being invalidated. Moreover, means are provided to affix to the check when used data indicative of the status of the register, thus providing a record of the postage dispensed by the particular meter. This recording closely represents the present requirement where the Post Office must periodically be provided with written data indicating the postage meter usage, that is, the cumulative amount of postage dispensed by the meter installed at a customer. The present invention contemplates that a used check with the use data of the meter affixed thereupon must be returned to the Post Office for purchase of another check adapted to update the credit register.

Other and still further features of the present invention will be more clearly apparent from the following description when taken in conjunction with the accompanying drawings.

DETAILED DESCRIPTION

Figure 1:
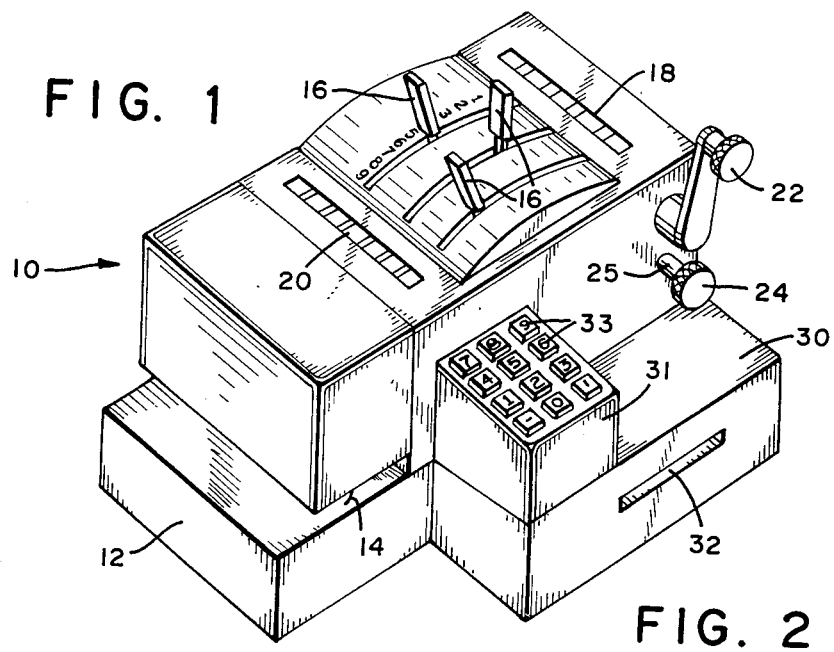
FIG. 1 is a perspective view of the metering device.

Referring now to the figures and FIG. 1 in particular, there is shown a postage meter 10 which includes, quite conventionally, a housing 12 with a slot 14 for receiving therein envelopes or other items upon which a variable amount of postage is to be affixed. There is provided, furthermore, a series of adjustable levers 16 which are movable to the amount of postage to be dispensed. A descending counter 18 displaying numerals in the associated window shows the amount of credit remaining in the credit register while an ascending counter 20 with an associated display window indicates the cumulative amount of postage dispensed. A lever 22 is operable for imprinting the amount of postage set by levers 16 whereupon the counters 18 and 20 forming a part of the conventional register mechanism reflect the changed status of the register, that is, the counter 18 shows the amount of credit remaining in the register whereas the counter 20 indicates the new value of the cumulative amount of postage dispensed. The knob 24 mounted below the lever 22 when turned serves to increase the credit register by a predetermined amount. The mechanism shown hereinabove is substantially the same as is available in the conventional postage meter except that the knob 24 has been repositioned, see for instance U.S. Pat. No. 3,596,247.

Figure 2:
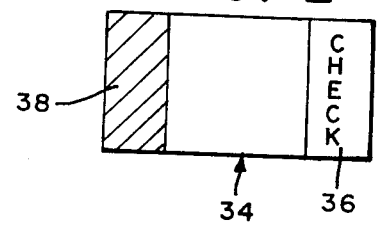
FIG. 2 is a plan view of a typical check used for the instant invention.

The modification of the present arrangement comprises the check accepting means 30 extending laterally from the base of the housing 12 and containing additional mechanisms which will be described hereinbelow. The check accepting means includes a slot 32 for receiving therein a check substantially as shown in FIG. 2. In addition, there is provided a code keying mechanism 31 having a plurality of pushbuttons 33 similar to a telephone key set for producing a code signal.

With reference to FIG. 2, a check 34, typically a plastic card, is provided with certain imprinted material 36 and a field 38, preferably a magnetic area which is encoded with data. In the present embodiment, the field 38 is encoded with data for resetting the credit register to an increased credit balance. In accordance with the invention a check of this type is purchased from the Post Office or some other authorized agency and is necessary for "updating," that is charging, the postage meter for increasing the balance of the credit register by a predetermined sum of money.

Figure 3:
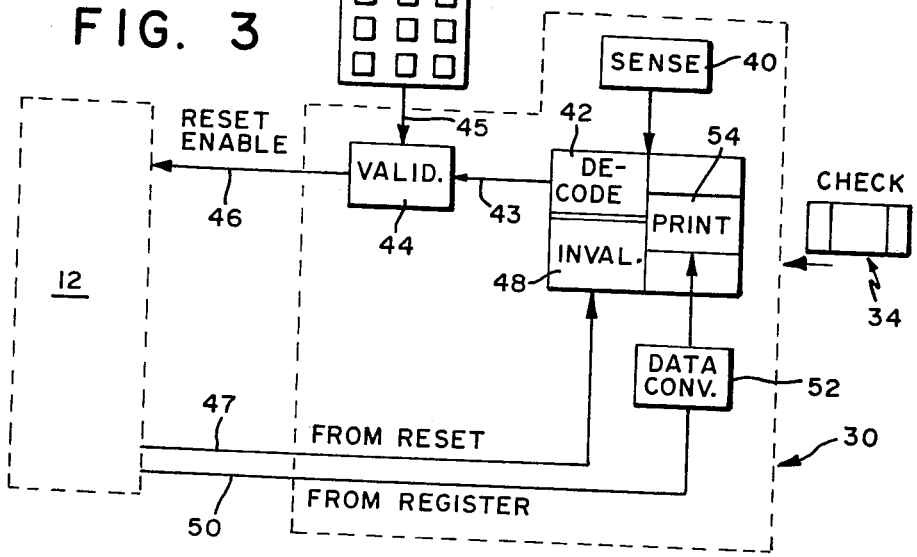
FIG. 3 is a schematic block diagram of the features comprising the present invention.

In order to update the credit register a check 34 is inserted into the slot 32 of the check accepting means 30. With reference to FIG. 3, a sensing means 40 establishes the presence of the check 34 in the check accepting means. The sensing means, typically, comprises a microswitch or light responsive control means. The decoding means 42 is actuated responsive to operation of the sensing means 40 and if the decoding means establishes authenticity of the coded data in field 38, an output signal is provided via conductor 43 to the validation circuit 44. If the decoder 42 does not establish authenticity of the encoded check, no signal or an incorrect one appears along conductor 43. The validation circuit 44 requires also receipt of a predetermined operator code responsive signal from the keying mechanism 31 as the result of a number of keys 33 being operated in pedetermined sequence. Such operator code signal is provided by conductor 45 to the validation circuit 44. If the validation circuit receives the appropriate "valid" signals via conductors 43 and 45, a suitable enable signal is transmitted via conductor 46 to the credit register for causing the shaft 25 of the knob 24, which normally is uncoupled, to become coupled to the credit register. Upon rotating the knob 24 while the shaft 25 is coupled, the credit register is increased by a predetermined sum of money whereupon the knob 24 becomes disabled once again. The use of a clutch mechanism for temporarily coupling the shaft 25 to the credit register responsive to an electrical signal for charging the credit register is shown, for instance, in my previously issued U.S. Pat. No. 3,501,744, FIG. 5, items 82 and 90. Responsive to the resetting of the credit register a signal is furnished via conductor 47 to an invalidating means 48 which acts upon the coded field 38 of the check 34 to cause invalidation of the check so as to inhibit subsequent use thereof. In addition, a signal from the register provides along conductor 50 data corresponding to the setting of the register to the data converter 52. The converter includes means for setting print means 54 in accordance with the setting of the register and causes the check 34 to be imprinted with such information, in the preferred embodiment, the setting of the ascending counter 20 which contains the cumulative amount of postage imprinted. The data converter 52 may include an analog to digital converter if the signal along conductor 47 is in digitized form. The check can now be withdrawn from the postage meter and upon its return to the Post Office or to the issuing agency, a new check can be purchased to once again charge or reset the credit register. By virtue of the check 34 having been provided with data representing the status of the register such as the cumulative amount of postage dispensed, the check serves the same documentary evidence as is required now by the Post Office where the subscriber periodically must submit a postal card stating the meter number and the readings of its ascending register for indicating the cumulative amount of postage dispensed by the meter under his control.

In an alternative embodiment, the conductor 50 may provide two sets of data, namely the data pertaining to the status of the register and data pertaining to the identity of the meter, such as the serial number of the meter. Both of these data can readily be imprinted upon the check. When the latter check is brought to the Post Office, the Office once again has a record of the meter identification and of the postage dispensed by the specific meter.

In a further embodiment, the check 34 is inserted into the check accepting means 30 and upon validation thereof, the credit register is reset as described heretofore, but it is required that the check remain inserted for retaining the meter operative. For updating the credit register with a new incremental amount of money, the check is withdrawn and a new or second check is inserted. However, prior to the withdrawal of the first check, responsive to a control mechanism, such as manually operated pushbutton, the data converter 52 is provided with the setting from the register and in turn encodes the check, whereupon this check is ejected and further operation of the postage meter is inhibited and only restored by a succeeding check. In this latter embodiment the Post Office receives information of the status of the meter, which information is of a more recent date. However, since the historical record of a postage meter is of importance, it does not appear important as to which of the arrangements is used. In addition, if desired, the data converter 52, of course, may include a dating device to affix also the date when the imprinting occurred.

The decoding means 42 comprise preferably magnetic sensing and deciphering means as are commonly used in bank credit machines. The invalidating means 48 may comprise printing or punching means, demagnetizing means, acting upon the field 38 for erasing the prior validation code, heating means, or other mutilating means. As is evident from the above description, the present arrangement overcomes the need for periodically transporting the meter mechanism to the Post Office and instead provides for the use of a check which is purchased from the Post Office or some other agency and serves for updating the credit register of the postage meter. Safeguards are provided so that the check must be of proper character and is invalidated after use.

While there has been described a preferred embodiment of my invention and several modifications have been indicated, it will be apparent to those skilled in the art that various further changes and modifications may be made therein without departing from the principle of the invention which shall be limited only by the scope of the appended claims.

What is claimed is:

1. A metering device of the postage meter type or similar type comprising:

a metering mechanism including printing means for printing adjustable indicia representative of monetary units;

register means including a credit register and a cumulative register coupled to said printing means for registering in response to the operation of said printing means respectively the credit balance remaining in the metering mechanism and the cumulative monetary units printed;

control means coupled to said credit register and said printing means for preculding operation of said printing means when said credit register assumes a condition representative of a minimum credit balance;

resetting means coupled to said credit register for resettng said credit register to a condition representative of an increased credit balance;

check accepting means coupled to said metering mechanism for accepting a check;

decoding means cooperatively associated with said accepting means for determining the authenticity of a check accepted by said accepting means by sensing an encoded field of a respective check and in response to such check being authentic providing a first signal;

manually operable keying means for providing an operator code responsive second signal;

validation means coupled for receiving said first signal and said second signal and in response to said signals being of predetermined character rendering said resetting means operable for resetting said credit register to a condition representative of a increased credit balance, and invalidating means coupled to said resetting means and said check acceptance means for invalidation a check determined valid responsive to said resetting means having been rendered operable and reset said credit register.

2. A metering device of the postage meter type or similar type operable in conjunction with a check having an encoded field comprising:

a metering mechanism including printing means for printing adjustable indicia representative of monetary units;

register means including a credit register and cumulative register coupled to said printing means for registering in response to the operation of said printing means respectively the credit balance remaining in the metering mechanism and the cumulative monetary units printed;

control means coupled to said credit register and said printing means for precluding operation of said printing means when said credit register assumes a condition representative of a minimum credit balance;

resetting means coupled to said credit register for resetting said credit register to a condition representative of an increased credit balance responsive to the receipt of a reset signal;

check accepting means coupled to said metering mechanism for accepting a check;

authenticating means cooperatively associated with said accepting means for sensing said encoded field and determining the validity thereof;

keying means for providing an operator related code signal;

means coupled to said validation means said keying means and said resetting means for providing said reset signal to said resetting means in response to said validation means determining the encoded field being valid and said operator related code signal being of predetermined character, said reset signal rendering said resetting means operable for resetting said credit register to a condition representative of an increased credit balance, and invalidating means coupled to said resetting means and said check acceptance means for invalidating a check disposed in said check acceptance means responsive to said resetting means having been rendered operable and reset said credit register.

3. A metering device as set forth in claim 2, said invalidating means operating upon said encoded field.

4. A metering device as set forth in claim 2, and means sensing the placing of a check in said acceptance means and in response thereto causing operation of said decoding means.

5. A metering device as set forth in claim 2 and further means coupled to said resetting means and said metering mechanism for providing said check with data pertaining to said register means in response to the operation of said resetting means.

6. A metering device as set forth in claim 5, said data pertaining to the status of said cumulative register.

7. A metering device as set forth in claim 2, said resetting means resetting said credit register by a predetermined increment.

8. A metering device as set forth in claim 2, said resetting means including a manually operable control.

9. A metering device as set forth in claim 8, said manually operable control being adapted to operate a clutch mechanism.

10. A metering device as set forth in claim 2, said keying means comprising a number of pushbutton keys for operation in predetermined sequence.

* * * * *